US012024944B2

(12) United States Patent
He et al.

(10) Patent No.: US 12,024,944 B2
(45) Date of Patent: *Jul. 2, 2024

(54) LIFT CORD SPOOL FOR A MOTORIZED TREATMENT

(71) Applicant: Lutron Technology Company LLC, Coopersburg, PA (US)

(72) Inventors: Kai He, Emmaus, PA (US); Andrew Peter Schmalz, Macungie, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/929,436

(22) Filed: Sep. 2, 2022

(65) Prior Publication Data

US 2022/0412159 A1 Dec. 29, 2022

Related U.S. Application Data

(63) Continuation of application No. 16/870,279, filed on May 8, 2020, now Pat. No. 11,434,690.

(60) Provisional application No. 62/844,979, filed on May 8, 2019.

(51) Int. Cl.

*E06B 9/32* (2006.01)
*E06B 9/322* (2006.01)
*E06B 9/327* (2006.01)
*E06B 9/262* (2006.01)

(52) U.S. Cl.

CPC .............. *E06B 9/322* (2013.01); *E06B 9/327* (2013.01); *E06B 9/262* (2013.01); *E06B 2009/2627* (2013.01)

(58) Field of Classification Search

CPC .......... E06B 9/322; E06B 9/327; E06B 9/262; E06B 2009/2627; B65H 75/4471
See application file for complete search history.

(56) References Cited

U.S. PATENT DOCUMENTS 5,328,113 A 7/1994 de Chevron Villette et al.
6,588,480 B2 7/2003 Anderson
6,915,831 B2 7/2005 Anderson
7,178,577 B2 2/2007 Liu
(Continued)

FOREIGN PATENT DOCUMENTS

DE 19505824 A1 8/1996
EP 1983143 A1 10/2008
(Continued)

*Primary Examiner* — Johnnie A. Shablack
(74) *Attorney, Agent, or Firm* — Duane Morris LLP

(57) ABSTRACT

A lift cord spool assembly may be used in a motorized window treatment. The lift cord spool assembly may include a spool, a housing, and an end cap. The spool may be configured to windingly receive a lift cord of the motorized window treatment. A diameter of the spool may taper by approximately 0.5 degrees from the first end to an opposed second end. The housing may be configured to surround the spool. The end cap may be configured to attach to the housing, for example, such that the spool is retained within the housing. The end cap may include an inner surface, a shoulder, an aperture, and a guide. The guide may be configured to push the lift cord onto the spool as the lift cord is wound onto the spool. The guide may define a gradual slope around a circumference of the shoulder.

20 Claims, 10 Drawing Sheets

(56) References Cited

U.S. PATENT DOCUMENTS

| | | | |
|---|---|---|---|
| 7,210,646 | B2 | 5/2007 | Hsu |
| 7,370,683 | B2 | 5/2008 | Numajiri |
| 7,389,956 | B2 | 6/2008 | Hung |
| 7,464,742 | B2 | 12/2008 | Oskam et al. |
| 7,886,803 | B2 | 2/2011 | Anderson et al. |
| 8,113,264 | B2 | 2/2012 | Kirby et al. |
| 8,723,466 | B2 | 5/2014 | Chambers et al. |
| 8,777,148 | B2 | 7/2014 | LaGarde et al. |
| 8,950,461 | B2 | 2/2015 | Adams et al. |
| 9,157,273 | B2 | 10/2015 | Dekker et al. |
| 9,663,987 | B2 | 5/2017 | Huang et al. |
| 9,695,632 | B2 | 7/2017 | Anderson et al. |
| 10,724,294 | B2 | 7/2020 | Guerra et al. |
| 10,773,921 | B2 | 9/2020 | Nakanishi et al. |
| 11,434,690 | B2 * | 9/2022 | He .......................... E06B 9/322 |
| 2006/0042763 | A1 | 3/2006 | Le Ru |
| 2007/0029051 | A1 | 2/2007 | Nien et al. |
| 2008/0099157 | A1 | 5/2008 | Nien et al. |
| 2010/0270457 | A1 | 10/2010 | Ko |
| 2013/0126108 | A1 | 5/2013 | Klein Tuente et al. |
| 2017/0298687 | A1 | 10/2017 | Chen et al. |
| 2020/0355025 | A1 | 11/2020 | He et al. |

FOREIGN PATENT DOCUMENTS

| | | | |
|---|---|---|---|
| WO | 2005028801 | A1 | 3/2005 |
| WO | 2005090735 | A1 | 9/2005 |

* cited by examiner

LIFT CORD SPOOL FOR A MOTORIZED TREATMENT

CROSS-REFERENCE TO RELATED APPLICATIONS

This application is a continuation of U.S. patent application Ser. No. 16/870,279, filed May 8, 2020, which claims the benefit of U.S. Provisional Patent Application No. 62/844,979, filed May 8, 2019, the entire disclosures of which are hereby incorporated by reference.

BACKGROUND

Motorized window treatments typically include a flexible fabric or other means for covering a window in order to block or limit the daylight entering a space and to provide privacy. The motorized window treatments may include roller shades, cellular shades, Roman shades, Venetian blinds, and draperies. The motorized window treatments include a motor drive for movement of the fabric in front of the window to control the amount of the window that is covered by the fabric. For example, a motorized roller shade includes a flexible shade fabric wound onto an elongated roller tube with an electronic drive unit installed in the roller tube. The electronic drive unit includes a motor, such as a direct-current (DC) motor, which is operable to rotate the roller tube upon being energized by a DC voltage.

SUMMARY

A motorized window treatment may include a headrail, a covering material, a bottom bar, a motor drive unit, a drive shaft, a lift cord, and/or a lift cord spool assembly. The headrail may be elongate along a first direction. The headrail may be configured to be mounted to a structure. The headrail may define an internal cavity. The covering material may include a top end and a bottom end that is spaced from the top end along a second direction that is perpendicular to the first direction. The top end of the covering material may be attached to the headrail. The bottom bar may be attached to the bottom end of the covering material. The motor drive unit may be received within the internal cavity. The drive shaft may be coupled to the motor drive unit, for example, such that the motor drive unit is configured to rotate the drive shaft about a rotational axis. The lift cord may have a first end that is operatively attached to the drive shaft. The lift cord spool assembly may be coupled to the motor drive unit.

A lift cord spool assembly may be used in a motorized window treatment. The lift cord spool assembly may include a spool, a housing, and an end cap. The spool may be configured to windingly receive a lift cord of the motorized window treatment. The spool may be configured to rotate about a rotational axis. The spool may define a bore that extends therethrough along the rotational axis. The bore may be configured to receive a drive shaft of the motorized window treatment. The spool may define a protrusion that extends from a first end of the spool along the rotational axis. The spool may be cylindrical. A diameter of the spool may taper by approximately 0.5 degrees from the first end to an opposed second end. The housing may be configured to surround the spool.

The end cap may be configured to attach to the housing, for example, such that the spool is retained within the housing. The end cap may include an inner surface, a shoulder, an aperture, and a guide. The shoulder may be cylindrical. The shoulder may extend from the inner surface. The shoulder may be configured to abut the housing when the end cap is attached to the housing such that the lift cord is retained within the housing. The shoulder may comprise the aperture. The aperture may be configured to receive the lift cord.

The guide may be configured to push the lift cord onto the spool as the lift cord is wound onto the spool. The guide may extend from the inner surface and abuts the shoulder. The guide may define a gradual slope around a circumference of the shoulder, for example, such that the guide extends a first distance from the inner surface at a first location and a second distance from the inner surface at a second location. The second distance may be greater than the first distance. The first location may be defined proximate to a side of the aperture where the lift cord is wound onto the spool. The second location may be at least 270 degrees counter-clockwise from the first location along the circumference of the shoulder. The end cap may define an inner surface. The inner surface may include a hole therethrough, for example, at the rotational axis. The inner surface may be configured to abut the first end of the spool. The guide and the shoulder may intersect at a radiused edge.

DETAILED DESCRIPTION

Figure 1:
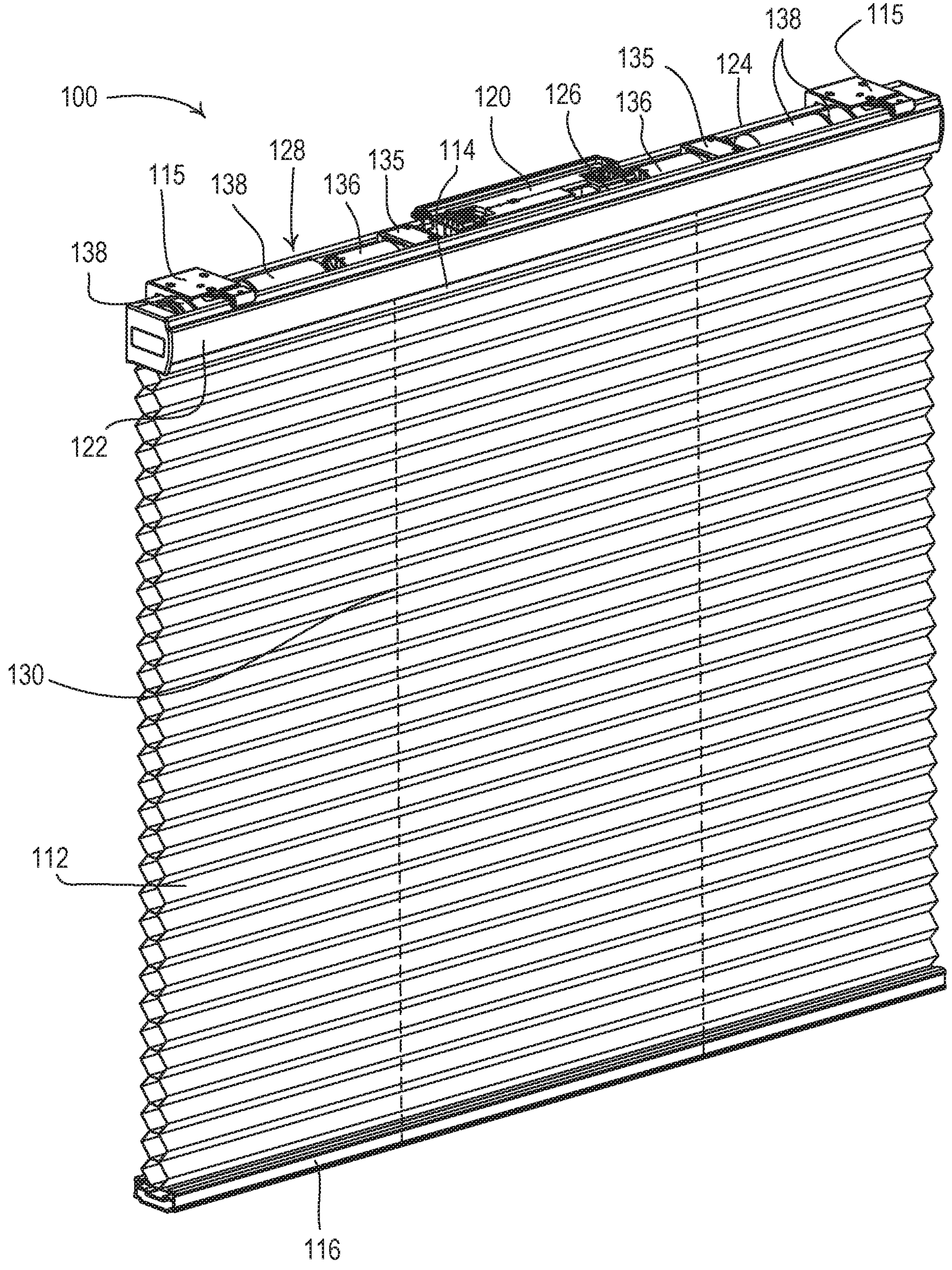
FIG. 1 is a perspective view of an example motorized window treatment.

FIG. 1 is a perspective view of an example motorized window treatment 100 that may be mounted, for example, in front of a window (not shown). The motorized window treatment 100 may include a covering material, for example, a cellular shade fabric 112 as shown in FIG. 1. The cellular shade fabric 112 may have a top end connected to a headrail 114 and a bottom end connected to a weighting element 116. The headrail 114 may extend between opposite ends that are connected to mounting brackets 115. The motorized window treatment 100 may be mounted such that the cellular shade fabric 112 is able to hang in front of the window, and may be adjusted between a fully-open position $P_{FULLY\text{-}OPEN}$ and a fully-closed position $P_{FULLY\text{-}CLOSED}$ to control the amount of daylight entering a room or space. The motorized window treatment 100 may alternatively include other types of covering materials, such as, for example, a plurality of horizontally-extending slats (i.e., a Venetian or Persian blind system), pleated blinds, a roller shade fabric, or a Roman shade fabric.

The motorized window treatment 100 may include a motor drive unit 120 for raising and lowering the weighting element 116 and the cellular shade fabric 112 between the fully-open position $P_{FULLY\text{-}OPEN}$ and the fully-closed position $P_{FULLY\text{-}CLOSED}$. By controlling the amount of the window covered by the cellular shade fabric 112, the motorized window treatment 100 may control the amount of daylight entering the room. The headrail 114 of the motorized window treatment 100 may include an internal side 122 and an opposite external side 124, which faces the window that the shade fabric 112 is covering. The motor drive unit 120 may include an actuator 126, which may be positioned adjacent the internal side 122 of the headrail 114 may be actuated when a user is configuring the motorized window treatment 100. The actuator 126 may be made of, for example, a clear material, such that the actuator 126 may operate as a light pipe to conduct illumination from inside the motor drive unit 120 to thus provide feedback to the user of the motorized window treatment 100. As shown in FIG. 1, a top side 128 of the headrail 114 is open, such that the motor drive unit 120 may be positioned inside the headrail and the actuator 126 may protrude slightly over the internal side 122 of the headrail 114.

Figure 2:
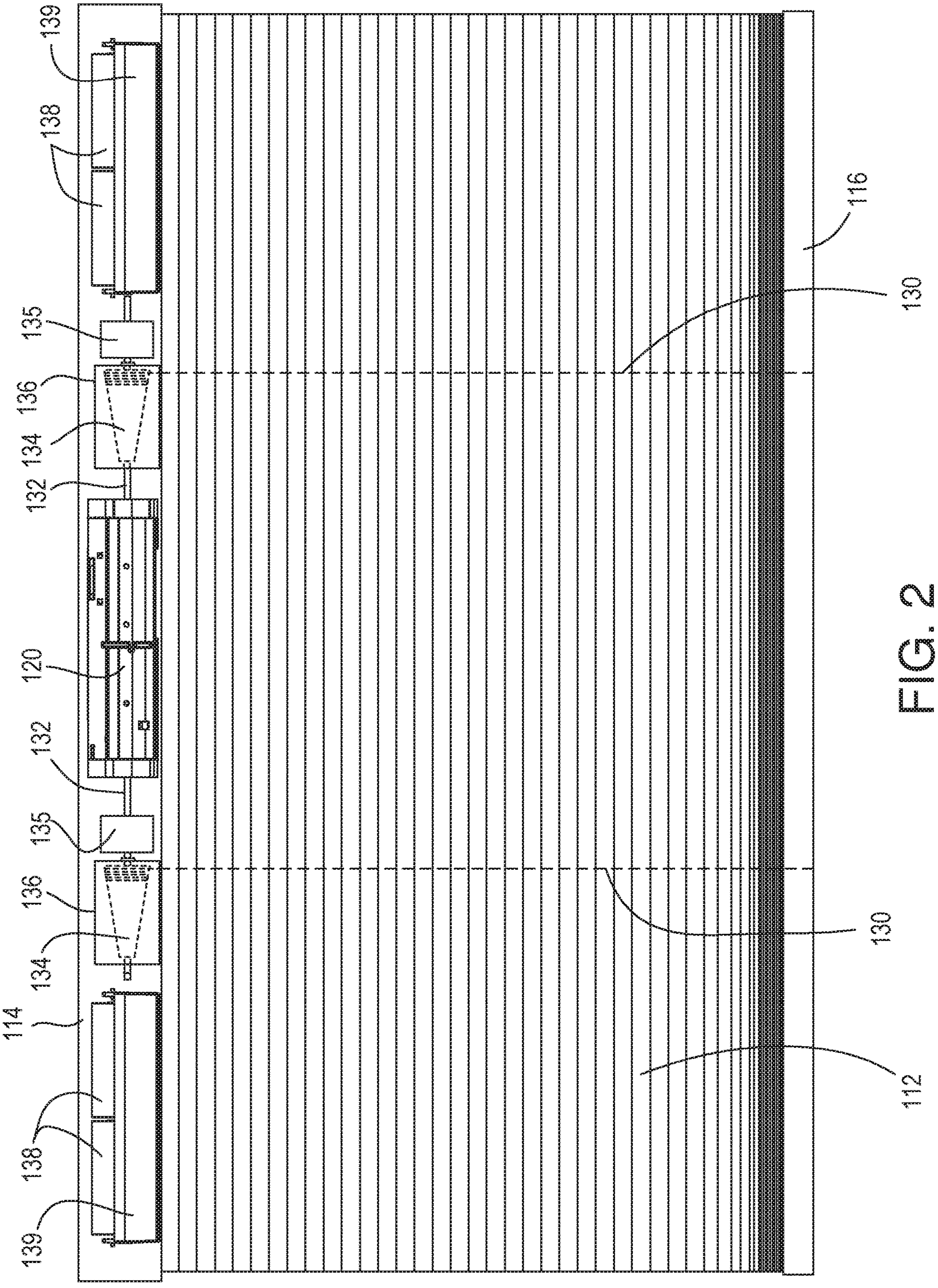
FIG. 2 is a front view of the motorized window treatment of FIG. 1 with a front portion of a headrail removed.
Figure 3:
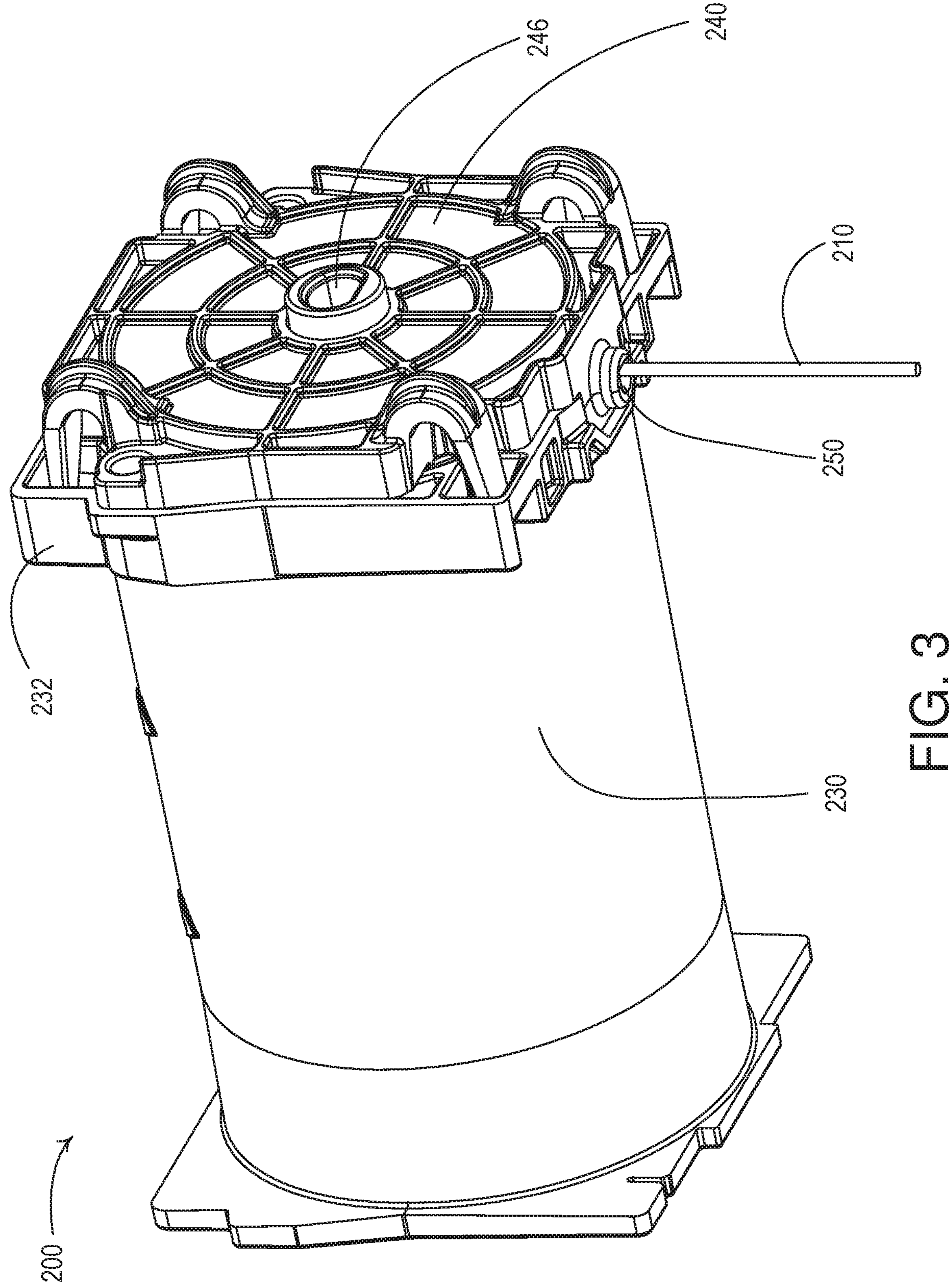
FIG. 3 is a perspective view of an example lift cord spool assembly of a motorized window treatment.
Figure 4:
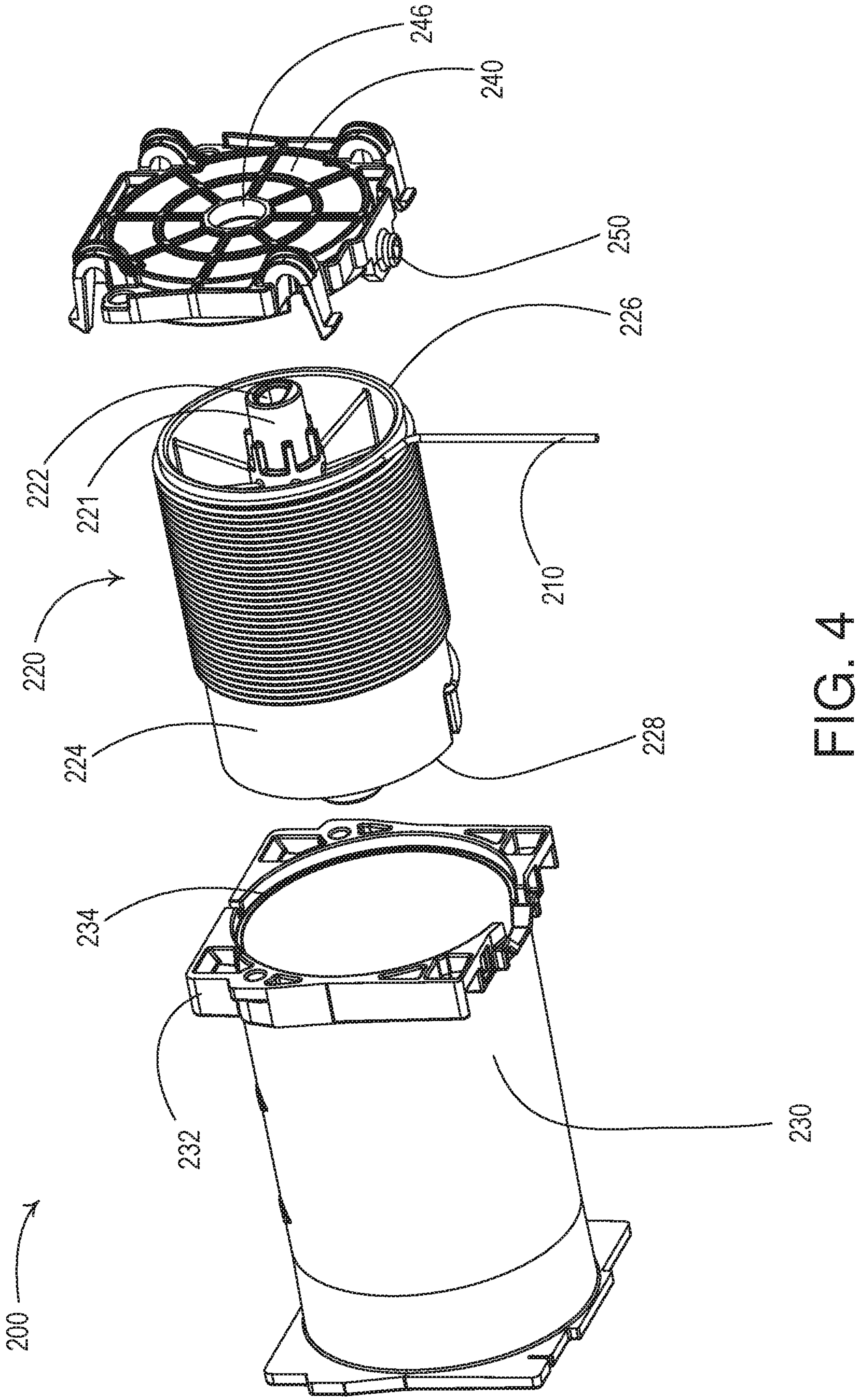
FIG. 4 is a partially exploded view of the example lift cord spool assembly of FIG. 3.
Figure 5:
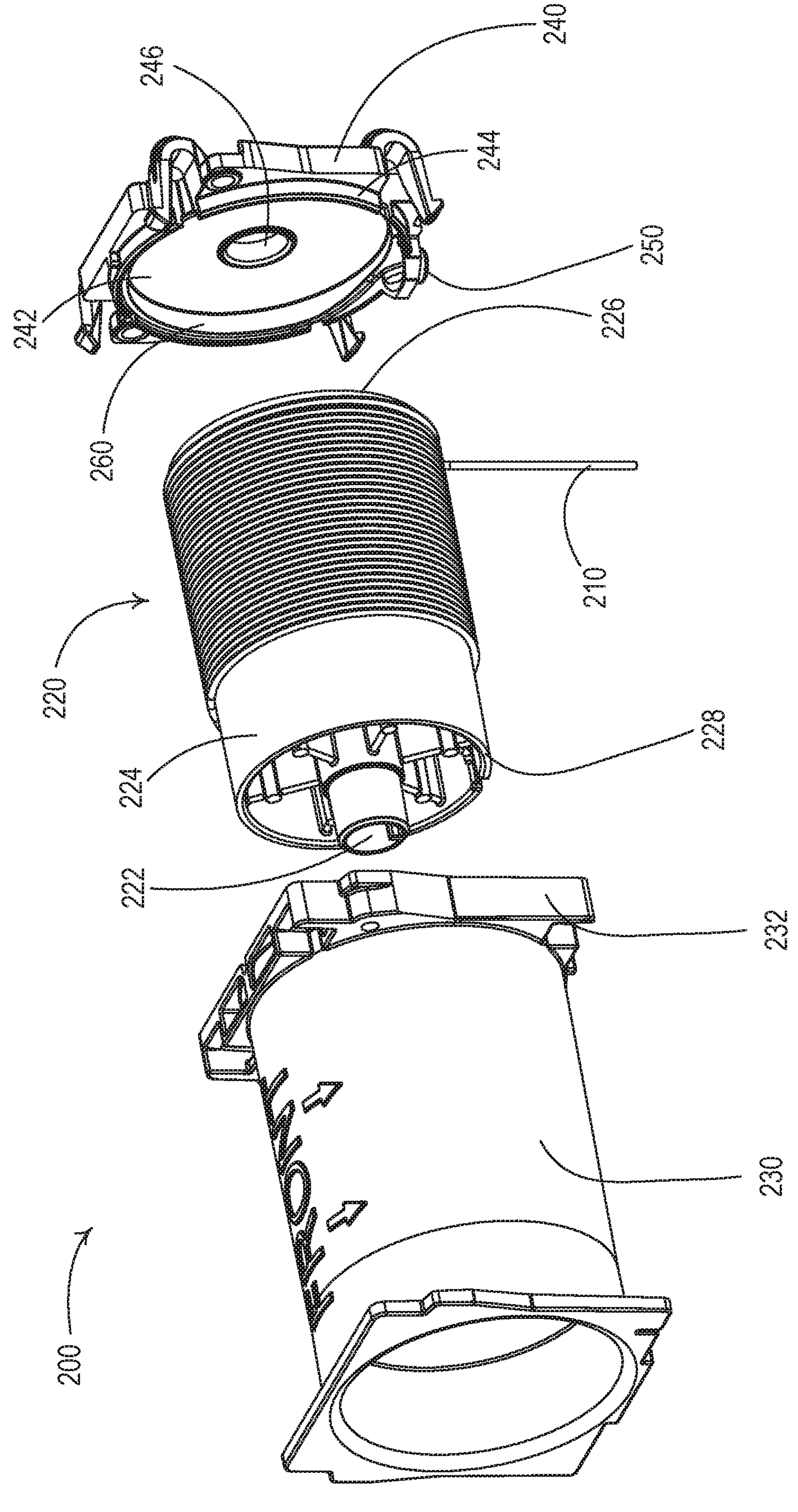
FIG. 5 is another partially exploded view of the example lift cord spool assembly of FIG. 3.

FIG. 2 is a front view of the motorized window treatment 100 with a front portion of the headrail 114 removed to show the motor drive unit 120, which may be located in the center of the headrail. The motorized window treatment 100 may include lift cords 130 that extend from the headrail 114 to the weighting element 116 for allowing the motor drive unit 120 to raise and lower the weighting element 116. The motor drive unit 120 may include an internal motor (not shown) coupled to drive shafts 132 that extend from the motor on each side of the motor and are each coupled to a respective lift cord spool 134. The lift cord spools 134 may each be housed in respective lift cord spool enclosures 136. The lift cords 130 may be windingly received around the lift cord spools 134 and are fixedly attached to the weighting element 116, such that the motor drive unit 120 is configured to rotate the drive shafts 132 to raise and lower the weighting element 116. The motorized window treatment 100 may also include two constant-force spring assist assemblies 135, which may each be coupled to the drive shafts 132 adjacent to one of the two lift cord spools 134.

The motorized window treatment 100 may include a plurality of batteries 138 (e.g., four D-cell batteries as shown in FIGS. 1 and 2), which may be electrically coupled in series. The series-combination of the batteries 138 may be coupled to the motor drive unit 120 for powering the motor drive unit 120. The batteries 138 may be housed inside the headrail 114 and thus out of view of a user of the motorized window treatment 110. The batteries 138 may be mounted in two battery holders 139 located inside the headrail 114, such that there are two batteries in each battery holder as shown in FIG. 2. Alternatively, the motorized window treatment 100 may include more batteries (e.g., six or eight) coupled in series or batteries of a different kind (e.g., AA batteries) coupled in series.

FIGS. 3-6 depict an example lift cord spool assembly 200. The lift cord spool assembly 200 may be configured for use in a motorized window treatment (e.g., such as the motorized window treatment 100 shown in FIGS. 1 and 2). For example, the lift cord spool assembly 200 may be configured to be received within a headrail (e.g., such as the headrail 114 shown in FIGS. 1 and 2) of the motorized window treatment. The motorized window treatment may be configured to receive a plurality of lift cord spool assemblies (e.g., such as the lift cord spool assembly 200). The lift cord spool assembly 200 may be configured to receive a lift cord 210 (e.g., such as the lift cords 130) of the motorized window treatment. The lift cord spool assembly 200 may include a spool 220, a housing 230, and an end cap 240. The lift cord spool assembly 200 may be configured to push the lift cord 210 onto the spool 220, for example, without compressing the lift cord 210. For example, the lift cord spool assembly 200 may be configured to push the lift cord 210 onto the spool 220 while reducing contact between windings of the lift cord 210 on the spool 220. The lift cord spool assembly 200 may designed to reduce manufacturing complexity and improve reliability.

The spool 220 may be configured to windingly receive the lift cord 210 (e.g., as the motorized window treatment is operated between a lowered position and a raised position). For example, the spool 220 may be configured to rotate about a rotational axis of the motorized window treatment. Rotation of the spool 220 may cause the lift cord 210 to be wound around and/or unwound from the spool 220. For example, the lift cord 210 may wind around the spool 220 as the motorized window treatment is raised (e.g., operated between a closed position and an open position). The lift cord 210 may unwind from the spool 220 as the motorized window treatment is lowered (e.g., operated between the open position and the closed position).

Figure 6:
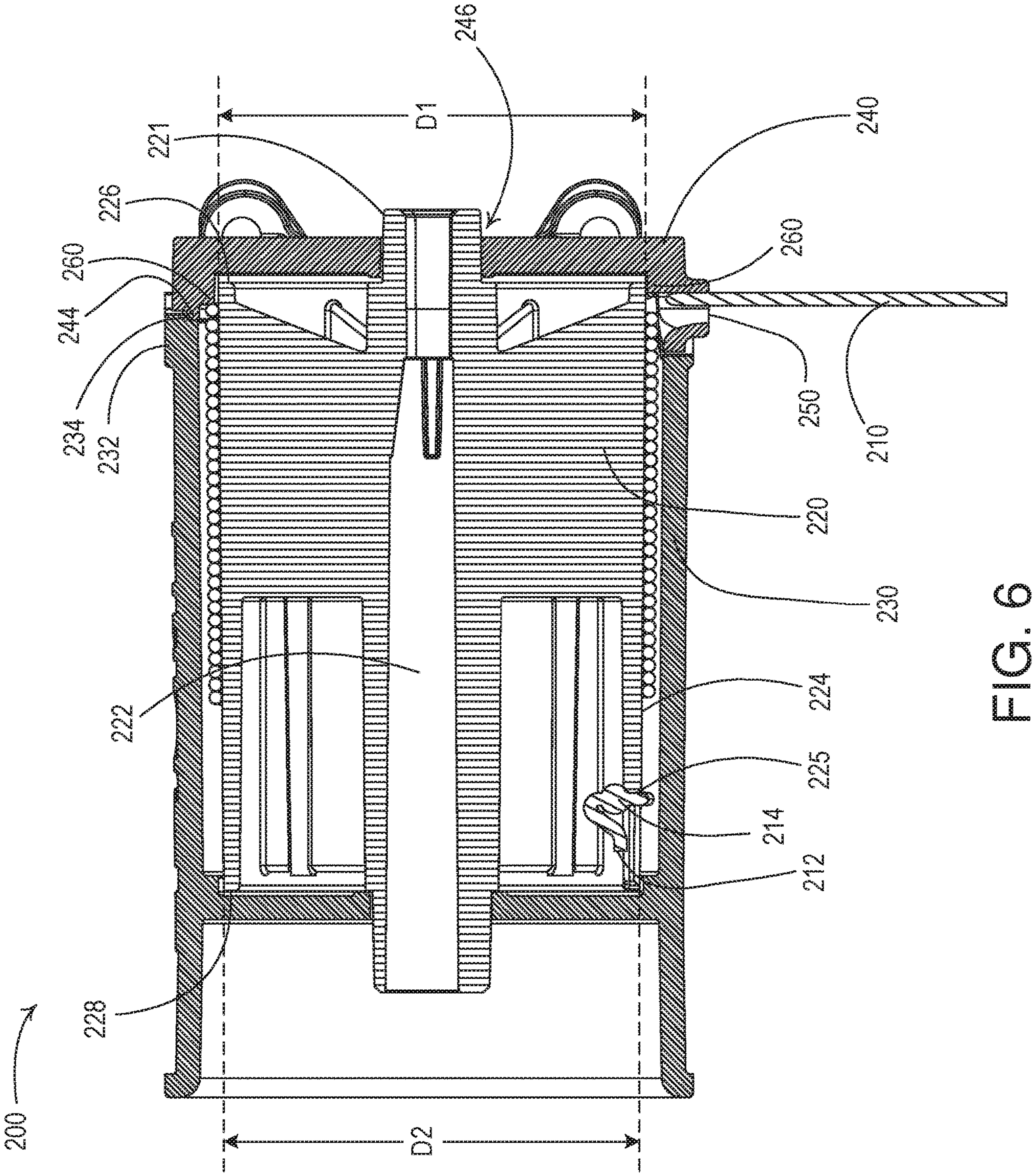
FIG. 6 is a cross-section view of the example lift cord spool assembly of FIG. 3.
Figure 7:
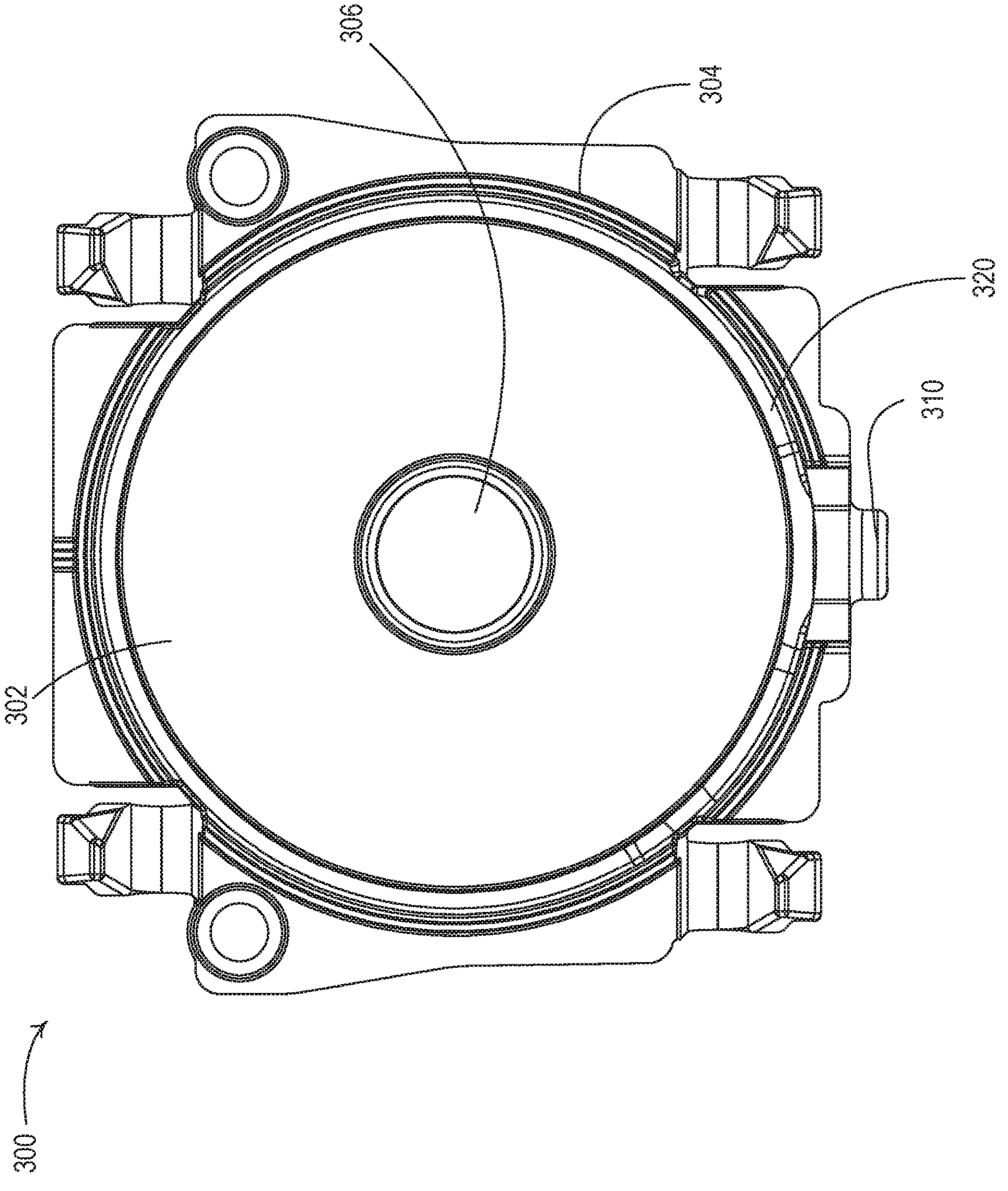
FIG. 7 is a side view of an example end cap of a lift cord spool assembly.
Figure 8:
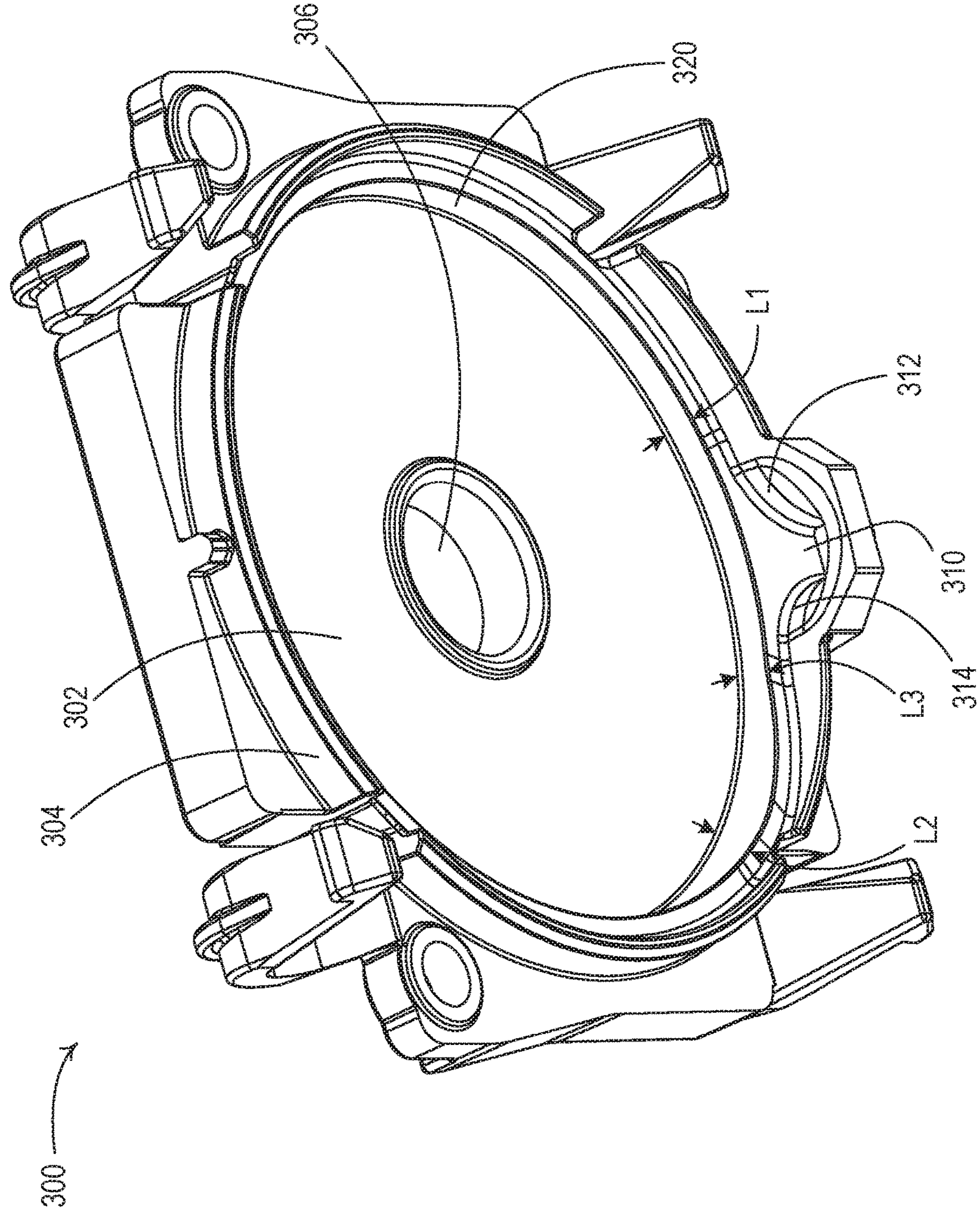
FIG. 8 is a perspective view of the example end cap of FIG. 7.
Figure 9:
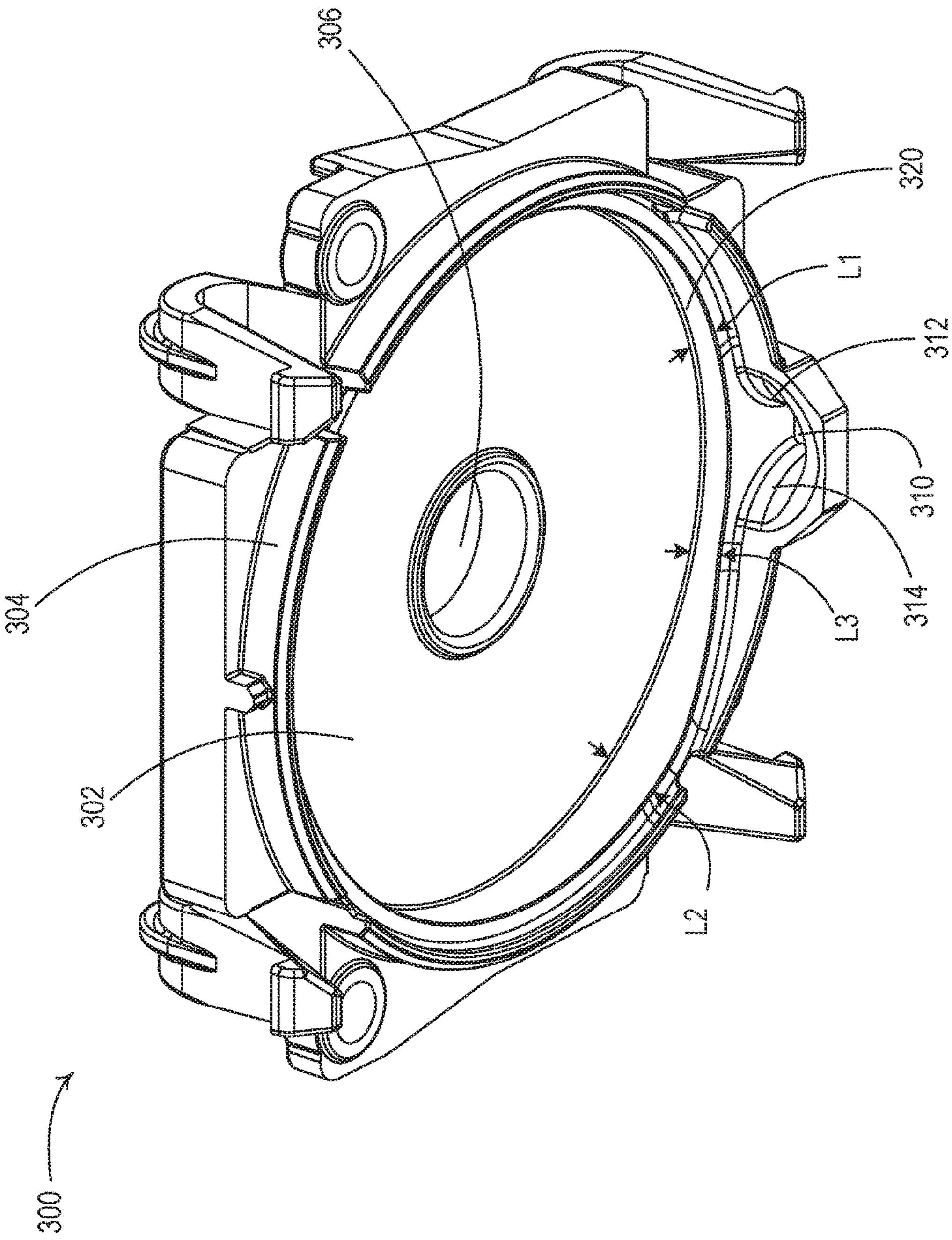
FIG. 9 is another perspective view of the example end cap of FIG. 7.
Figure 10:
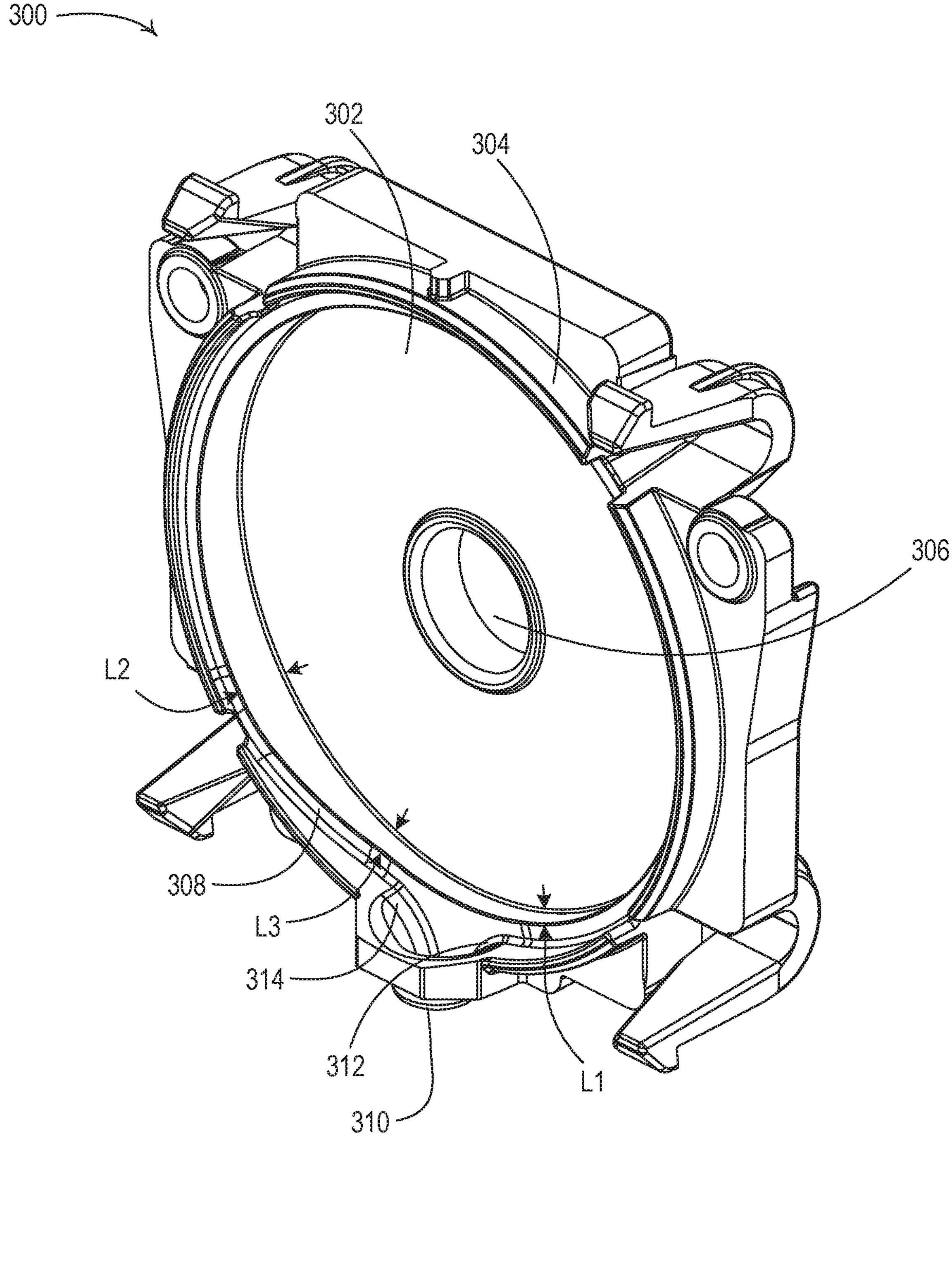
FIG. 10 is another perspective view of the example end cap of FIG. 7.

The spool 220 may define a bore 222 therethrough. The bore 222 may be located along the rotational axis of the motorized window treatment. The bore 222 may be configured to receive a drive shaft of the motorized window treatment. The spool 220 may define a cylindrical outer surface 224 that is configured to windingly receive the lift cord 210. The spool 220 may be configured to secure an end 212 (e.g., as shown in FIG. 6) of the lift cord 210. For example, the outer surface 224 may include a hole 225. The hole 225 may be configured to receive the end 212 of the lift cord 210 such that the lift cord 210 is secured to the spool 220. The end 212 of the lift cord 210 may include a knot 214 after being pushed through the hole 225. Although the end 212 of the lift cord 210 is shown secured to the spool using the knot 214, it should be appreciated that the lift cord 210 may also be attached to the spool 220 in other ways. In an example, the end 212 of the lift cord 210 may receive a stopper (not shown) that prevents the end 212 of the lift cord 210 from exiting the hole 225. The stopper may be a rubber bushing, a plug, a nut, or some other type of bushing.

The spool 220 may define a first end 226 and an opposed second end 228. The spool 220 may be tapered from the first end 226 to the second end 228. Stated differently, a diameter of the spool 220 may taper (e.g., by approximately 0.5 degrees) from the first end 226 to the second end 228. For example, the spool 220 may have a first diameter D1 at the first end 226 and a second diameter D2 at the second end 228. The spool 220 may gradually and/or evenly taper from the first diameter D1 at the first end 226 to the second diameter D2 at the second end 228. The taper of the spool 220 may be configured to guide the lift cord 210 across the outer surface 224 from the first end 226 toward the second end 228. The spool 220 may define a protrusion 221 that extends along the rotational axis beyond the first end 226. The protrusion 221 may be cylindrical. The protrusion 221 may be configured to be received by the end cap 240. In addition, the diameter of the spool 220 may taper by a different amount (e.g., by approximately 0.75 degrees).

Further, the spool 220 may have sections (not shown) that are tapered by different amounts.

The housing 230 may be configured to surround the spool 220 (e.g., the outer surface 224). For example, the housing 230 may enclose the spool 220 therein. The housing may define a flange 232. The flange 232 may be configured to attach to the end cap 240. For example, the flange 232 may attach to complimentary features of the end cap 240. The housing 230 (e.g., the flange 232) may define a seat 234.

The end cap 240 may be configured to attach to the housing 230 such that the spool 220 is retained within the housing 230. The end cap 240 may include an inner surface 242, a shoulder 244, an aperture 250, and a guide 260. The inner surface 242 may be proximate to the spool 220 when the end cap 240 is attached to the housing 230. The inner surface 242 may define a hole 246 therethrough. The hole 246 may be configured to receive the protrusion 221 of the spool 220. The hole 246 may be configured to receive the drive shaft of the motorized window treatment. The shoulder 244 may be cylindrical. The shoulder 244 may extend from the inner surface 242. The shoulder 244 may be configured to abut the housing 230 when the end cap 240 is attached to the housing 230. The shoulder 244 may be received by the seat 234 of the housing 230 when the end cap 240 is attached to the housing 230.

The aperture 250 may be configured to receive the lift cord 210, for example, as the lift cord 210 is wound and/or unwound from the spool 220. The aperture 250 may extend from the shoulder 244 of the end cap 240. The aperture 250 may be sloped to reduce friction on the lift cord 210 as the lift cord 210 is wound and/or unwound from the spool 220.

The guide 260 may be configured to direct (e.g., kick) the lift cord 210 onto the spool 220. The guide 260 may extend from the inner surface 242. The guide 260 may be proximate to the shoulder 244. For example, the guide 260 may abut the shoulder 244. The guide 260 may define a gradual slope around a circumference of the shoulder 244 such that the guide 260 extends a first distance from the inner surface 242 at a first location and a second distance from the inner surface 242 at a second location. The second distance may be greater than the first distance.

FIGS. 7-10 depict an example end cap 300 (e.g., such as end cap 240 shown in FIGS. 3-6) of a lift cord spool assembly (e.g., such as the lift cord spool assembly 200 shown in FIGS. 3-6) of a motorized window treatment (e.g., such as the motorized window treatment 100 shown in FIGS. 1 and 2). The end cap 300 may be configured to attach to a housing (e.g., the housing 230) of the lift cord spool assembly such that a spool is retained within the housing. The end cap 300 may include an inner surface 302, a shoulder 304, an aperture 310, and a guide 320. The inner surface 302 may be proximate to the spool when the end cap 300 is attached to the housing. The inner surface 302 may define a hole 306 therethrough. The hole 306 may be configured to receive a protrusion of the spool. The hole 306 may be configured to receive the drive shaft of the motorized window treatment. The shoulder 304 may be cylindrical. The shoulder 304 may extend from the inner surface 302. The shoulder 304 may be configured to abut the housing when the end cap 300 is attached to the housing.

The aperture 310 may be configured to receive a lift cord (e.g., the lift cord 210) of the motorized window treatment, for example, as the lift cord is wound onto and/or unwound from the spool. The aperture 310 may extend from the shoulder 304 of the end cap 300. The aperture 310 may be sloped to reduce friction on the lift cord as the lift cord is wound and/or unwound from the spool. The aperture 310 may be configured such that a metallic part (e.g., a metal eyelet) is not needed. The aperture 310 may define cord inlet portion 312 and an opposed portion 314. The inlet portion 312 may be configured to receive the lift cord. The inlet portion 312 and/or the opposed portion 314 may define a radiused connection between the aperture 310 and the shoulder 304.

The guide 320 may be configured to direct (e.g., kick) the lift cord onto the spool, for example, as the lift cord is wound onto the spool. Stated differently, the guide 320 may be configured to push the lift cord away from the end of the spool as the lift cord is wound onto the spool. At least a chord length of the guide 320 (e.g., measured from the aperture 310) may be configured to kick the lift cord onto the spool. For example, one and a half chord lengths of the guide 320 may be configured to kick the lift cord onto the spool. Stated differently, the lift cord may not abut the guide 320 past a chord length of the guide 320.

The guide 320 may extend from the inner surface 302. For example, the guide 320 may extend from the inner surface 302 proximate to the shoulder 304. For example, the guide 320 may abut the shoulder 304. The guide 320 may have varying thickness around the circumference of the guide 320. The guide 320 may define a gradual slope around a circumference of the guide 320. For example, the guide 320 may extend a first length L1 from the inner surface 302 at a first location and the guide 320 may extend a second length L2 from the inner surface 302 at a second location. The second length L2 may be greater than the first length L1. The guide 320 may increase (e.g., at a constant rate) in thickness from the first location to the second location. The first location may be defined proximate to a side (e.g., the inlet portion 312) of the aperture 310 where the lift cord is wound onto the spool. The second location may be at least 180 degrees (e.g., at least 270 degrees) counter-clockwise from the first location along the circumference of the shoulder 304.

The guide 320 may decrease (e.g., gradually) in thickness from the second location to a third location that is proximate to the opposed portion 314 of the aperture 310. For example, the guide may extend a third length L3 from the inner surface 302 at the third location. The third length L3 may be less than the second length L2. The gradual decrease in thickness of the guide 320 from the second location to the third location may be configured to prevent the lift cord from catching as the lift cord is unwound from the spool.

The guide 320 and shoulder 304 may intersect at a radiused edge 308 along the outer perimeter of the guide 320. The radiused edge 308 may reduce friction on the lift cord as the lift cord is wound and/or unwound from the spool.

Although the figures show an example geometry of the guide 260, 320, it should be appreciated that the guide 260, 320 is not limited to this example geometry. Stated differently, the guide 260, 320 may have alternative geometry to that shown in the figures and still push the lift cord away from the end of the spool without compressing the lift cord.

It should further be appreciated that configuring the lift cord spool assembly 200 such that the end cap 240, 300 is configured to push the lift cord 210 onto the spool 220 without compressing the lift cord 210 may provide one or more advantages. For example, so configuring the lift cord spool assembly may reduce manufacturing complexity, increase design flexibility, and/or increase reliability of a motorized window treatment.

What is claimed is:

1. A lift cord spool assembly for a motorized window treatment, the lift cord spool assembly comprising:

a spool that is configured to windingly receive a lift cord of the motorized window treatment, the spool configured to rotate about a rotational axis;

a housing that is configured to surround the spool and including an end portion, the end portion including a guide that is configured to push the lift cord onto the spool as the lift cord is wound onto the spool, the guide extending from a surface of the end portion and configured to extend around an entire circumference of the spool, at least a portion of the guide defining a gradual slope such that the guide extends a first length from the surface of the end portion at a first location and a second length from the surface of the end portion at a second location, wherein the second length is greater than the first length.

2. The lift cord spool assembly of claim 1, wherein the end portion includes an aperture configured to receive the lift cord, and wherein the first location is defined proximate to a side of the aperture where the lift cord is wound onto the spool, and wherein the second location is at least 270 degrees counter-clockwise from the first location along a circumference of the guide.

3. The lift cord spool assembly of claim 1, wherein the spool defines a bore that extends therethrough along the rotational axis, the bore sized and configured to receive a drive shaft of the motorized window treatment.

4. The lift cord spool assembly of claim 3, wherein the bore is configured to receive a drive shaft of the motorized window treatment.

5. The lift cord spool assembly of claim 1, wherein the end portion includes an end cap that is attachable to the housing, the end cap defining a hole therethrough.

6. The lift cord spool assembly of claim 5, wherein an inner surface of the end cap is configured to abut an end of the spool.

7. The lift cord spool assembly of claim 6, wherein the spool defines a protrusion that extends along the rotational axis from the end of the spool, the protrusion configured to be received within the hole.

8. The lift cord spool assembly of claim 6, wherein the spool is cylindrical and the end of the spool is a first end, and wherein the spool is tapered by approximately 0.5 degrees from a first diameter at the first end to a second diameter at an opposed second end.

9. The lift cord spool assembly of claim 1, wherein the end portion includes a shoulder from which the guide extends, and wherein the guide and the shoulder intersect at a radiused edge.

10. The lift cord spool assembly of claim 9, wherein the shoulder defines an aperture sized and configured to receive the lift cord.

11. A motorized window treatment comprising:

a headrail that is elongate along a first direction and is configured to be mounted to a structure, the headrail defining an internal cavity;

a covering material having a top end and a bottom end spaced from the top end along a second direction that is perpendicular to the first direction, the top end of the covering material being attached to the headrail;

a bottom bar attached to the bottom end of the covering material;

a motor drive unit that is received within the internal cavity;

a drive shaft that is coupled to the motor drive unit such that the motor drive unit is configured to rotate the drive shaft about a rotational axis;

a lift cord having a first end that is operatively attached to the drive shaft;

a lift cord spool assembly that is coupled to the motor drive unit, the lift cord spool assembly comprising:

a spool that is configured to windingly receive the lift cord, the spool configured to rotate about the rotational axis;

a housing that is configured to surround the spool and including an end portion, the end portion including a guide that is configured to push the lift cord onto the spool as the lift cord is wound onto the spool, the guide extending from a surface of the end portion and configured to extend around an entire circumference of the spool, at least a portion of the guide defining a gradual slope such that the guide extends a first length from the surface of the end portion at a first location and a second length from the surface of the end portion at a second location, wherein the second length is greater than the first length.

12. The motorized window treatment of claim 11, wherein the end portion includes an aperture configured to receive the lift cord, and wherein the first location is defined at a side of the aperture where the lift cord is wound onto the spool, and wherein the second location is at least 270 degrees counter-clockwise from the first location along a circumference of the guide.

13. The motorized window treatment of claim 11, wherein the spool defines a bore that extends therethrough along the rotational axis.

14. The motorized window treatment of claim 13, wherein the bore is configured to receive the drive shaft of the motorized window treatment.

15. The motorized window treatment of claim 11, wherein the end portion includes an end cap configured to be attached to the housing, the end cap defining a hole therethrough.

16. The motorized window treatment of claim 15, wherein an inner surface of the end cap is configured to abut an end of the spool.

17. The motorized window treatment of claim 16, wherein the spool defines a protrusion that extends along the rotational axis from the end of the spool, the protrusion configured to be received within the hole.

18. The motorized window treatment of claim 16, wherein the spool is cylindrical and the end of the spool is a first end, and wherein the spool is tapered by approximately 0.5 degrees from a first diameter at the first end to a second diameter at an opposed second end.

19. The motorized window treatment of claim 11, wherein the end portion includes a shoulder from which the guide extends, and wherein the guide and the shoulder intersect at a radiused edge.

20. The motorized window treatment of claim 19, wherein the shoulder defines an aperture sized and configured to receive the lift cord.

* * * * *